R. W. H. ATCHERSON & W. SIDDALL.
METHOD OF EFFECTING THE PRECIPITATION OF FLUE DUST IN BLAST FURNACES
AND OF PREVENTING THE FORMATION OF THE SAME.
APPLICATION FILED JUNE 12, 1905.
912,641.  Patented Feb. 16, 1909.
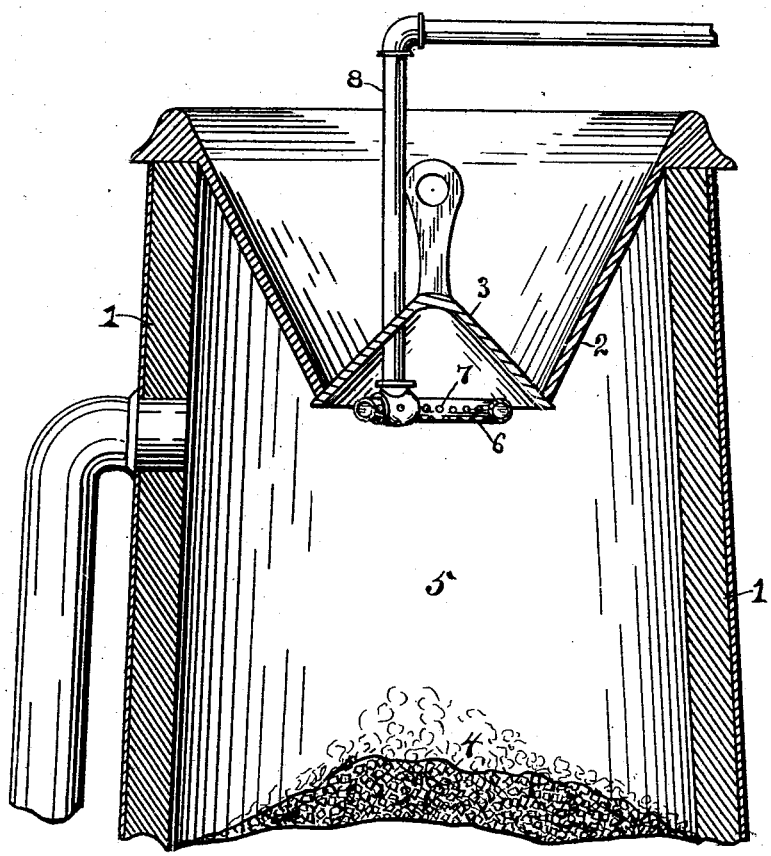

UNITED STATES PATENT OFFICE.

RALPH W. H. ATCHERSON AND WILLIAM SIDDALL, OF BELLAIRE, OHIO.

METHOD OF EFFECTING THE PRECIPITATION OF FLUE-DUST IN BLAST-FURNACES AND OF PREVENTING THE FORMATION OF THE SAME.

No. 912,641.     Specification of Letters Patent.     Patented Feb. 16, 1909.

Application filed June 12, 1905. Serial No. 264,807.

*To all whom it may concern:*

Be it known that we, RALPH W. H. ATCHERSON and WILLIAM SIDDALL, citizens of the United States of America, and residents of Bellaire, county of Belmont, and State of Ohio, have invented certain new and useful Improvements in Methods of Effecting the Precipitation of Flue-Dust in Blast-Furnaces and of Preventing the Formation of the Same, of which the following is a specification.

Our invention relates to a novel method whereby dust and other particles of solid matter are prevented from issuing from a blast furnace and the like with the gas which is generated therein; and said method consists in introducing within the gas zone or the path of travel of the gas an opposing force sufficient to overcome the momentum of the said dust or solid matter which is carried in suspension and cause it to remain in the furnace. The opposing force referred to may be in the form of gas, water, or steam, and is adapted to precipitate such dust particles or solid matter as has a tendency to rise with the furnace gas, and also to prevent, to a great extent, the tendency of such dust, particles of raw material, or solid matter to rise with said furnace gas.

In describing our said method in detail, reference is herein had to the accompanying drawing, forming part of this specification, in which the figure is a vertical section of the top of a blast-furnace stack, illustrating, also in vertical section, one of various means which might be employed for carrying out our said method.

In said drawing, 1 indicates the wall of the stack, 2 the canopy-like top thereof, and 3 the movable bell, all of a usual or ordinary construction, while 4 indicates the bed of raw material in the furnace, and 5 the gas zone.

At a suitable point above the raw-material bed 4, preferably directly beneath the bell 3, is mounted in a suitable manner a perforated pipe 6, preferably circular in form, the perforations 7 of which are so directed as to have within their range the whole of the gas zone 5. Connected with the perforated pipe 6 is a pipe 8 leading from a suitable source of supply of gas, water, or steam, preferably the latter. The gas, water, or steam, as the case may be, is discharged under pressure through the perforations 7 with sufficient force to overcome the momentum of the dust particles or solid matter carried in suspension by the gas arising from the raw material and to cause its precipitation. Further, when water or steam is employed as the opposing agent, it has a tendency to prevent dust from arising from the bed of raw material with the gas.

As is obvious, our method may be employed in the gas mains as well as in the top of the furnace, and the result will be precisely the same.

Having thus described our invention, what we claim as new, and desire to secure by Letters Patent, is—

The method of precipitating dust or solid matter from the furnace gas of blast furnaces and the like, which consists in directing throughout the whole of the gas zone of the furnace jets of a dust-dampening agent under high pressure for dampening the fuel-bed and for overcoming the momentum of such dust-particles as are carried in suspension by said gas.

Signed by us in the presence of two subscribing witnesses.

RALPH W. H. ATCHERSON.
WILLIAM SIDDALL.

Witnesses:
H. E. DUNLAP,
ROBT. F. DILWORTH.